US012151857B2

(12) United States Patent
Bellamah

(10) Patent No.: US 12,151,857 B2
(45) **Date of Patent: *Nov. 26, 2024**

(54) METHOD OF FORMING BLANK WITH PLATFORM PANEL AND FOOT PANEL

(71) Applicant: Altria Client Services LLC, Richmond, VA (US)

(72) Inventor: Stephen J. Bellamah, Midlothian, VA (US)

(73) Assignee: Altria Client Services LLC, Richmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/360,370

(22) Filed: Jul. 27, 2023

(65) Prior Publication Data

US 2023/0365294 A1 Nov. 16, 2023

Related U.S. Application Data

(62) Division of application No. 17/738,148, filed on May 6, 2022, now Pat. No. 11,713,156, which is a division (Continued)

(51) Int. Cl.

*B31B 50/82* (2017.01)
*B31B 50/00* (2017.01)

(Continued)

(52) U.S. Cl.

CPC ........ *B65D 5/5004* (2013.01); *B31B 50/0042* (2017.08); *B31B 50/25* (2017.08);

(Continued)

(58) Field of Classification Search

CPC ..... B31B 50/52; B31B 50/0042; B31B 50/25; B31B 50/82; B65D 5/542; B65D 5/5004; B65D 5/725; B65D 5/4204; B65D 5/16

(Continued)

(56) References Cited

U.S. PATENT DOCUMENTS 271,177 A 1/1883 White
902,347 A * 10/1908 Tillinghast ............ B65D 71/36 229/122.1

(Continued)

FOREIGN PATENT DOCUMENTS

WO WO-2016/179345 A1 11/2016
WO WO-2017/023685 A1 2/2017

(Continued)

OTHER PUBLICATIONS

Grizzly long cut package containing canisters (single photograph), sold in stores during summer of 2018.

(Continued)

*Primary Examiner* — Christopher R Demeree
(74) *Attorney, Agent, or Firm* — Harness, Dickey & Pierce, P.L.C.

(57) ABSTRACT

The method includes defining a plurality of fold lines that divide the blank into a plurality of sidewall panels, forming at least one platform panel on a bottom end of the plurality of sidewall panels, and forming at least one foot panel on a first side edge of the plurality of sidewall panels near the bottom end, the at least one foot panel being configured to at least partially support the at least one platform panel once the blank is folded into an assembled package.

30 Claims, 12 Drawing Sheets

Related U.S. Application Data of application No. 17/034,192, filed on Sep. 28, 2020, now Pat. No. 11,325,742, which is a division of application No. 16/415,090, filed on May 17, 2019, now Pat. No. 10,787,289.

(51) Int. Cl.
*B31B 50/25* (2017.01)
*B31B 50/52* (2017.01)
*B65D 5/50* (2006.01)
*B65D 5/54* (2006.01)

(52) U.S. Cl.
CPC .............. *B31B 50/52* (2017.08); *B31B 50/82* (2017.08); *B65D 5/542* (2013.01)

(58) Field of Classification Search
USPC ......... 229/122, 242, 122.1, 221, 240, 122.2, 229/122.32; 206/738, 526, 499; D9/416, D9/733; 221/305, 302, 309, 155, 194, 221/303
See application file for complete search history.

(56) References Cited

U.S. PATENT DOCUMENTS 1,764,468 A 6/1930 Pratt
2,072,695 A 3/1937 Wellman
D120,649 S 5/1940 Novak
2,299,027 A 10/1942 Novak
D162,809 S 4/1951 Gay
2,729,326 A 1/1956 Stadnyk
2,771,988 A 11/1956 Sweeney
2,875,938 A 3/1959 Bramhill
2,886,232 A 5/1959 Leone
3,164,298 A 1/1965 Repko
3,204,762 A 9/1965 Shanok et al.
3,263,861 A 8/1966 Carr
3,278,080 A 10/1966 Luco
3,306,437 A 2/1967 Nelson
3,356,279 A 12/1967 Root
3,450,308 A 6/1969 Schoenefeld
D224,692 S 8/1972 Gray
D249,764 S 10/1978 Burklacich
4,170,325 A 10/1979 Pawlowski et al.
4,170,914 A 10/1979 Carrier
4,306,666 A 12/1981 Trammell, Sr.
4,405,044 A 9/1983 Flower et al.
4,566,607 A 1/1986 Smith
4,739,922 A 4/1988 Zimmermann
4,752,029 A 6/1988 Buford
4,805,765 A 2/1989 Barrett et al.
4,899,929 A 2/1990 Grollman
D306,946 S * 4/1990 Merdic .......................... D6/520
D308,146 S 5/1990 Speaker
D309,262 S 7/1990 Coiner
D321,134 S 10/1991 Toinet
D321,647 S 11/1991 Oldorf
5,143,210 A 9/1992 Warwick et al.
D333,781 S 3/1993 Kobel
5,249,737 A 10/1993 Fritz et al.
5,370,220 A 12/1994 Wang
5,425,474 A 6/1995 Dalea et al.
5,443,204 A 8/1995 O'Donnell et al.
5,458,272 A 10/1995 Ward-Weber
D381,850 S 8/1997 Alig et al.
D400,095 S 10/1998 Uebele
5,833,118 A * 11/1998 Weiss .................... B65D 5/725 229/122.1
5,836,478 A 11/1998 Weiss
D403,576 S 1/1999 Weiss
6,050,402 A 4/2000 Walter
D425,415 S 5/2000 Kumakura
6,062,424 A 5/2000 Simile-Gravina et al.
D429,462 S 8/2000 Kumakura et al.
D430,437 S 9/2000 Shimbo et al.
D431,931 S 10/2000 Sicignano, III
6,176,419 B1 1/2001 Holley, Jr.
6,216,944 B1 4/2001 Maglione
6,237,757 B1 5/2001 Alpern et al.
6,253,930 B1 7/2001 Freidus et al.
6,598,737 B2 7/2003 Rudnick
D482,914 S 12/2003 Prasad
6,851,553 B2 2/2005 Venable et al.
D502,621 S 3/2005 Ho
6,871,778 B2 3/2005 Petrelli et al.
6,874,678 B2 4/2005 Prokosch et al.
6,902,062 B1 6/2005 Kumakura et al.
6,929,172 B2 8/2005 Bates et al.
D509,689 S 9/2005 Ho
6,951,300 B2 10/2005 Caille et al.
7,073,665 B2 7/2006 Auclair et al.
D528,434 S 9/2006 Wolpow
7,134,593 B2 11/2006 Harrelson
D533,464 S 12/2006 Wolpow
D537,734 S 3/2007 Wolpow
7,195,118 B2 3/2007 Sutherland
D543,400 S 5/2007 Ho
D545,098 S 6/2007 Wolfson
7,284,662 B2 10/2007 DeBusk et al.
7,328,798 B2 2/2008 Auclair et al.
7,331,509 B2 2/2008 Bates et al.
7,357,254 B2 4/2008 Auclair et al.
D570,210 S 6/2008 McGrath
D572,955 S 7/2008 Barcena Zafra
7,413,101 B2 8/2008 Smalley et al.
D576,824 S 9/2008 Eksrom
D586,234 S 2/2009 Lamoury
7,604,157 B2 10/2009 Zammit et al.
D604,602 S 11/2009 Kohno
7,648,048 B2 1/2010 Smith
7,658,317 B2 2/2010 Wilkins
7,703,665 B2 4/2010 McGowan
7,721,889 B2 5/2010 Sutherland
7,743,972 B2 6/2010 Fogle
7,762,451 B2 7/2010 Harrelson
D643,747 S 8/2011 Rye et al.
7,992,765 B2 8/2011 Brand
8,162,206 B2 4/2012 Harrelson
8,485,423 B2 7/2013 Thomas et al.
8,720,743 B2 5/2014 Smalley et al.
D706,129 S 6/2014 Boraczek et al.
9,096,344 B1 8/2015 Block
9,096,345 B2 8/2015 Bogdziewicz et al.
9,120,612 B2 9/2015 Fath et al.
9,309,034 B2 4/2016 Paredes et al.
D758,181 S 6/2016 Lutz et al.
D760,072 S 6/2016 Lutz
9,475,606 B2 10/2016 Ball et al.
D778,149 S 2/2017 Frick
D781,142 S 3/2017 Trujillo
D793,224 S 8/2017 Sagardoy Muniesa et al.
D794,443 S 8/2017 Frick
D804,302 S 12/2017 Larkin et al.
9,994,344 B2 6/2018 Buscema et al.
10,065,762 B2 9/2018 Schultz et al.
D830,789 S 10/2018 Brooks
D837,645 S 1/2019 Larkin et al.
10,173,820 B2 1/2019 Patwardhan
10,179,671 B2 1/2019 Umentum et al.
10,214,342 B2 2/2019 Parcevaux
D843,128 S 3/2019 Pena
D845,759 S 4/2019 Arzano
10,259,611 B2 4/2019 Grace et al.
10,435,217 B2 10/2019 Paredes et al.
10,479,549 B2 11/2019 Kearns
D870,551 S 12/2019 Klesmith
10,543,955 B1 1/2020 Turturro et al.
D877,530 S 3/2020 Sperry
D885,883 S 6/2020 Hagee et al.
10,669,062 B2 6/2020 Schultz et al.
10,759,555 B2 9/2020 Buscema et al.
2002/0074248 A1 6/2002 Venable
2004/0099558 A1 5/2004 Oliff et al.

(56) References Cited

U.S. PATENT DOCUMENTS

| | | | | |
|---|---|---|---|---|
| 2005/0199690 | A1* | 9/2005 | Peterson | B65D 5/0254 229/122.1 |
| 2005/0274638 | A1 | 12/2005 | Smith | |
| 2006/0027639 | A1 | 2/2006 | Rasmussen | |
| 2006/0283927 | A1 | 12/2006 | Walsh et al. | |
| 2007/0152028 | A1 | 7/2007 | McGowan | |
| 2010/0044421 | A1 | 2/2010 | Learn | |
| 2011/0036749 | A1 | 2/2011 | Jacobsson et al. | |
| 2012/0018503 | A1 | 1/2012 | Walling et al. | |
| 2012/0255968 | A1 | 10/2012 | Karay et al. | |
| 2012/0325840 | A1 | 12/2012 | Restaino | |
| 2012/0325841 | A1 | 12/2012 | Restaino | |
| 2012/0325842 | A1 | 12/2012 | Restaino | |
| 2014/0319205 | A1 | 10/2014 | Schultz | |
| 2016/0185484 | A1 | 6/2016 | Bakx | |
| 2017/0029162 | A1 | 2/2017 | Kearns | |
| 2017/0203872 | A1 | 7/2017 | Grace et al. | |
| 2018/0009598 | A1 | 1/2018 | Parcevaux | |
| 2018/0044086 | A1 | 2/2018 | Patwardhan | |
| 2018/0141734 | A1 | 5/2018 | Kooc et al. | |
| 2018/0162575 | A1 | 6/2018 | Buscema et al. | |
| 2018/0370680 | A1 | 12/2018 | Schultz et al. | |
| 2019/0217988 | A1 | 7/2019 | Umentum et al. | |
| 2020/0216246 | A1 | 7/2020 | Ball et al. | |
| 2020/0317391 | A1 | 10/2020 | Schultz et al. | |
| 2021/0039828 | A1 | 2/2021 | Song et al. | |
| 2021/0092997 | A1 | 4/2021 | Lin | |
| 2021/0100222 | A1 | 4/2021 | Hawkins et al. | |

FOREIGN PATENT DOCUMENTS

| | | | |
|---|---|---|---|
| WO | WO-2020/017735 | A1 | 1/2020 |
| WO | WO-2020/212360 | A1 | 10/2020 |

OTHER PUBLICATIONS

Office Action dated Oct. 6, 2020, issued in co-pending U.S. Appl. No. 29/691,652.

Hannah Jackson, "Tea Hugger" retrieved Aug. 14, 2020 from URL: https://www.behance.net/gallery/846291/Tea-Hugger.

Brang Reynolds, "Why I Learned Sourcing Packaging for My Nutraceutical Brand" published on Mar. 7, 2018, retrieved Aug. 14, 2020 from URL: https://medium.com/in-formation-holdings/what-i-learned-sourcing-packaging-million-dollar-idea-project-8feeea09e87b.

Notice of Allowance dated Mar. 29, 2021, issued in co-pending U.S. Appl. No. 29/691,652.

Notice of Allowance dated Jul. 13, 2021, issued in co-pending U.S. Appl. No. 29/691,652.

Notice of Allowance dated Dec. 1, 2021, issued in co-pending U.S. Appl. No. 29/691,652.

* cited by examiner

METHOD OF FORMING BLANK WITH PLATFORM PANEL AND FOOT PANEL

CROSS-REFERENCE TO RELATED APPLICATIONS

This application is a divisional of U.S. application Ser. No. 17/738,148, filed May 6, 2022, which is a divisional of U.S. application Ser. No. 17/034,192, filed Sep. 28, 2020, which is a divisional of U.S. application Ser. No. 16/415,090, filed May 17, 2019, the entire contents of each of which are incorporated herein by reference.

BACKGROUND

Field

Example embodiments relate generally to a blank with a platform panel and a foot panel, and a package with the platform panel and the foot panel.

Related Art

Packages that are cartons are often used to store and ship consumer items. Generally, once the carton is received by a store, the contents of the carton are removed to display and sell the consumer items.

SUMMARY

At least one example embodiment is directed toward a blank.

In one example embodiment, the blank includes a plurality of sidewall panels; at least one platform panel extending from a lower end of the blank, the at least one platform panel being configured to be folded to form a platform upon assembly of a package using the blank; at least one foot panel extending from the lower end of the blank, the at least one foot panel being configured to be folded and at least partially positioned under the platform to support at least one portion of the platform upon assembly of the package; and a tear-off section defined by at least a portion of the lower end of the blank.

In one example embodiment, the plurality of sidewall panels includes a front panel, a first side panel connected to a first side edge of the front panel, a second side panel connected to a second side edge of the front panel, and at least one first back panel connected to the first side panel, the second side panel or both the first side panel and the second side panel.

In one example embodiment, the at least one platform panel extends from a first bottom edge of the front panel, the at least one platform panel including, a first platform panel, and a second platform panel at a first end of the first platform panel.

In one example embodiment, the at least one platform panel further includes, a third platform panel at a second end of the first platform panel, the third platform panel connecting the first platform panel to the front panel, and a fourth platform panel connected to the second platform panel, the first platform panel having a greater length than the second platform panel, the third platform panel and the fourth platform panel.

In one example embodiment, upon assembly of the package the first platform panel is declined, from a second end of the first platform panel to the first end of the platform panel, the second end of the platform panel contacting the front panel, and the second platform panel is inclined, from a first end of the second platform panel to a second end of the second platform panel, the first end of the platform panel being connected to the first platform panel.

In one example embodiment, the at least one foot panel extends at least from a lower first side of the blank, the at least one foot panel including, at least one first foot panel connected to the lower first side of the blank, and at least one second foot panel connected to the at least one first foot panel.

In one example embodiment, upon assembly of the package the at least one first foot panel and the at least one second foot panel both span between the front panel and the at least one first back panel, the at least one first foot panel being connected to the second side panel.

In one example embodiment, a second bottom edge of the first side panel and a third bottom edge of the second side panel are sloped, in an upward direction, relative to a first bottom edge of the front panel.

In one example embodiment, the at least one first back panel includes, a first back panel connected along a first side edge of the first side panel, and a second back panel connected along a second side edge of the second side panel, and the at least one foot panel extends from one of the first back panel, the second back panel, or both the first back panel and the second back panel.

In one example embodiment, the blank further includes at least one first top panel extending from a first top end of the blank; a tuck panel on a second top edge of the at least one first top panel, the tuck panel having a first curved edge and a second curved edge, the at least one first top panel and the tuck panel defining a first side slit and a second side slit between the tuck panel and the at least one first top panel; a first dust panel connected to a second top edge of a first sidewall panel, of the plurality of sidewall panels, the first dust panel including a first sloped side edge and a second sloped side edge between a first side edge and a third top edge of the first dust panel, the second sloped side edge having a greater slope angle than the first sloped side edge relative to the third top edge; and a second dust panel connected to a fourth top edge of a second sidewall panel, of the plurality of sidewall panels, the second dust panel including a third sloped side edge and a fourth sloped side edge between a second side edge and a fifth top edge of the second dust panel, the fourth sloped side edge having a greater slope angle than the third sloped side edge relative to the fifth top edge.

In one example embodiment, the tear-off section is defined by at least the front panel.

In one example embodiment, the tear-off section is further defined by the first side panel, the second side panel or both the first side panel and the second side panel, and the tear-off section, the front panel, the first side panel, the second side panel, or combinations thereof, at least partially define at least one first finger hole.

At least one example embodiment is directed toward a package.

In one example embodiment, the package includes a plurality of sidewalls; a platform structure at least partially forming a first end of the package, the platform structure including at least one platform panel; at least one foot panel extending from the first end of the package, the at least one foot panel being at least partially positioned under the platform structure to support at least one portion of the platform structure; and a tear-off section defined by at least a lower end of the package.

In one example embodiment, the plurality of sidewalls include, a front panel, at least one back panel opposing the front panel, a first side panel, and a second side panel opposing the first side panel.

In one example embodiment, the at least one platform panel includes, a first platform panel that is configured to at least partially support one or more consumer items that are to be dispensed from the first end of the package.

In one example embodiment, the at least one platform panel further includes, a second platform panel at a first end of the first platform panel, the first platform panel being declined from a second end of the first platform panel to the first end of the first platform panel, and the second platform panel is inclined from a first end of the second platform panel to a second end of the second platform panel, the first end of the second platform panel being connected to the first end of the first platform panel.

In one example embodiment, a first bottom edge of the first side panel and a second bottom edge of the second side panel are sloped in an upward direction, from the front panel to the at least one back panel, causing the package to incline backwards relative to a third bottom edge of the front panel.

In one example embodiment, at least one first portion of the at least one foot panel spans across a bottom of the first end of the package, the at least one first portion spanning between an opposing pair of sidewalls, of the plurality of sidewalls.

In one example embodiment, at least one first portion of the at least one foot panel spans between an opposing pair of sidewalls of the plurality of sidewalls, at least a portion of an upper edge of the at least one foot panel being in direct contact with a lower surface of the first platform panel, and at least a portion of a lower edge of the at least one foot panel extends to a lowest-most elevation of the first end of the package.

In one example embodiment, the tear-off section includes a center portion, and the plurality of sidewalls incline backward relative to the center portion of the tear-off section.

In one example embodiment, the front panel at least partially defines the tear-off section, and a first longitudinal length of the at least one back panel is shorter than a second longitudinal length of the front panel, such that the plurality of sidewalls incline backwards relative to a location of the tear-off section on the front panel.

In one example embodiment, the tear-off section is further defined by the first side panel, the second side panel or both the first side panel and the second side panel, and the tear-off section, the front panel, the first side panel, the second side panel, or combinations thereof, at least partially define at least one first finger hole.

In one example embodiment, the package is configured to be converted from a carton to a dispenser by removing the tear-off section.

In one example embodiment, the platform structure at least partially forms a bottom-most surface of the package.

In one example embodiment, the package further includes at least one first top panel extending from a second end of the package, the at least one first top panel is re-closeable.

DETAILED DESCRIPTION

Figure 1:
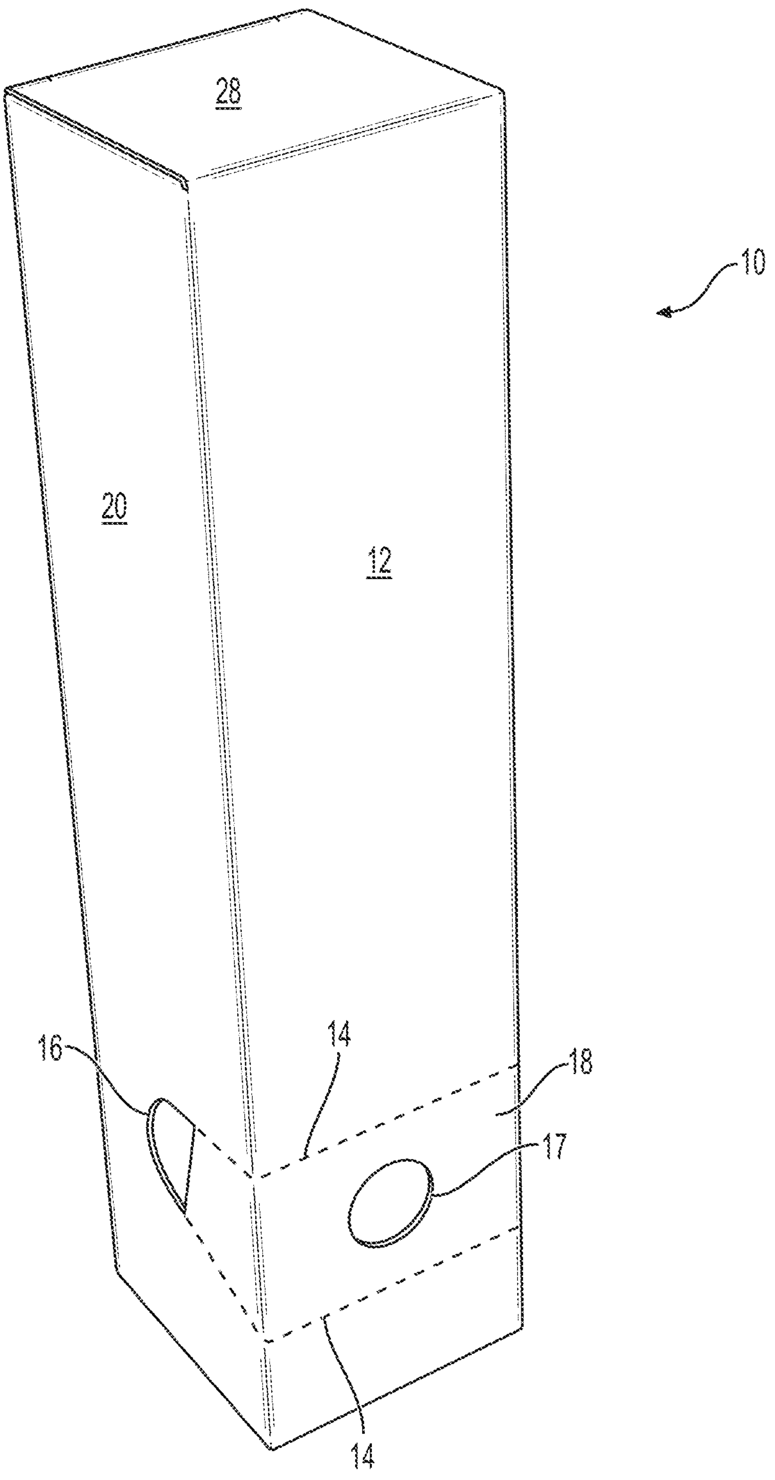
FIG. 1 is an illustration of a front perspective view of a package, in accordance with an example embodiment.

Some detailed example embodiments are disclosed herein. However, specific structural and functional details disclosed herein are merely representative for purposes of describing example embodiments. Example embodiments may, however, be embodied in many alternate forms and should not be construed as limited to only the example embodiments set forth herein.

Accordingly, while example embodiments are capable of various modifications and alternative forms, example embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives thereof.

It should be understood that when an element is referred to as being "on," "connected to," "coupled to," "attached to," "adjacent to," or "covering", etc., another element or layer, it may be directly on, connected to, coupled to, attached to, adjacent to or covering, etc., the other element or layer, or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, regions, layers and/or sections, these elements, regions, layers, and/or sections should not be limited by these terms. These terms are only used to distinguish one element, region, layer, or section from another region, layer, or section. Thus, a first element, region, layer, or section discussed below could be termed a second element, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various example embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, and/or elements, but do not preclude the presence or addition of one or more other features, integers, steps, operations, elements and/or groups thereof.

When the words "about" and "substantially" are used in this specification in connection with a numerical value, or if these terms are able to be equated to a numerical value, it is intended that the associated numerical value include a tolerance of ±10% around the stated numerical value, unless otherwise explicitly defined.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

In the drawings, the thicknesses of layers and regions may be exaggerated or under-exaggerated for clarity. In this document, a fold line includes a fold, a score line, a crease line, an embossed line, a molded line, a stamped line, a printed line, a pressed line, or any other type of line that is considered a fold line in the art, or any combinations thereof. A fold line is formed from folding, carving, molding, stamping, printing, embossing, pressing, or combinations thereof.

FIG. 1 is an illustration of a front perspective view of a package 10, in accordance with an example embodiment. In an example embodiment, the package 10 includes a tear-off section 18. In an example embodiment, the tear-off section 18 is at least partially defined by a lower end of the package 10. In an example embodiment, the tear-off section 18 is at least partially defined by a front panel 12 of the package 10. In an example embodiment, a tear line 14 circumscribes or partially circumscribes the tear-off section 18, allowing the tear-off section 18 to be torn off to convert the package 10 from a carton (e.g., for storing and/or shipping consumer items) to a gravity-fed dispenser (e.g., for dispensing consumer items). In an example embodiment, the tear-off section 18 is at least partially defined by a first side panel 20 and a second side panel 22 (e.g., see the second side panel 22 in FIG. 2). In an example embodiment, the tear-off section 18 is defined by the front panel 12, the first side panel 20, the second side panel, a back wall 25 (see FIG. 2), or a combination thereof.

In an example embodiment, the tear line 14 is a line formed by a line of slits or perforations that act to weaken the package 10 material to allow the tear-off section 18 to be removed from the remainder of the package 10. In an example embodiment, the tear line 14 is a significantly scored line that acts to weaken the package 10 material to make the material easy to tear, a line of perforations, or any other type of line that is considered a tear line in the art, or any combinations thereof. In an example embodiment, the tear line 14 can include tear line portions 14*a*-14*f* sown, for example, in FIG. 6.

Figure 4:
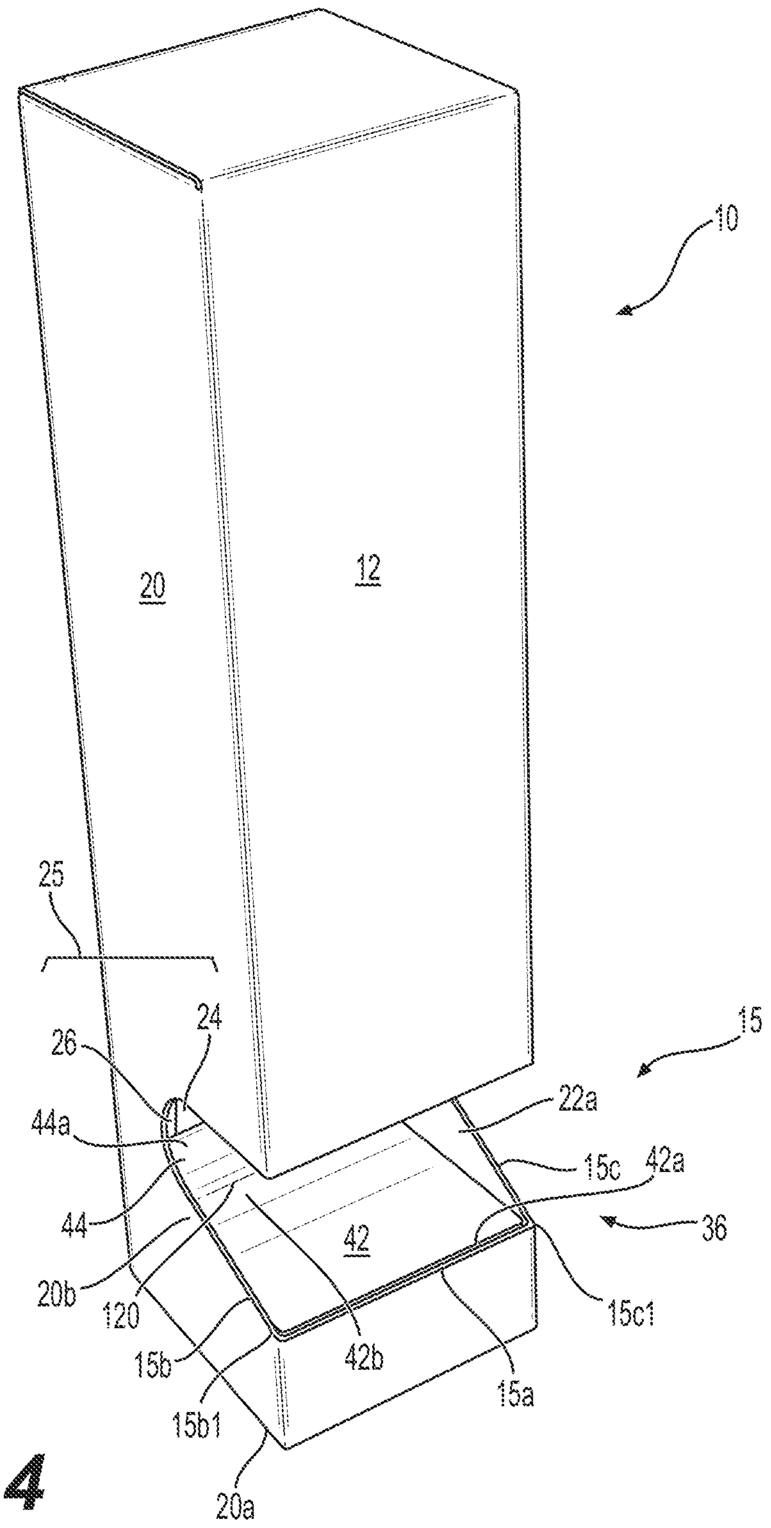
FIG. 4 is an illustration of a front perspective view of the package, with a tear-off section torn off, in accordance with an example embodiment.

In an example embodiment, the package 10 includes at least one side finger hole 16 that facilitates the tearing off of the tear-off section 18 (see FIG. 4, after the tear-off section 18 has been removed). In an example embodiment, the tear-off section 18 defines a center finger hole 17. In an example embodiment, the center finger hole 17 is circular. In an example embodiment, the at least one side finger hole 16, or the center finger hole 17, or both, are defined by the tear-off section 18, the front panel 12, the first side panel 20, the second side panel 22, or combinations thereof.

In an example embodiment, at least one top panel 28 is included on a top end of the package 10. In an example embodiment, as described in further detail herein, the at least one top panel 28 allows the top end of the package 10 to be opened and closed without damaging the top end of the package 10 (e.g., the at least one top panel 28 is re-closeable).

Figure 2:
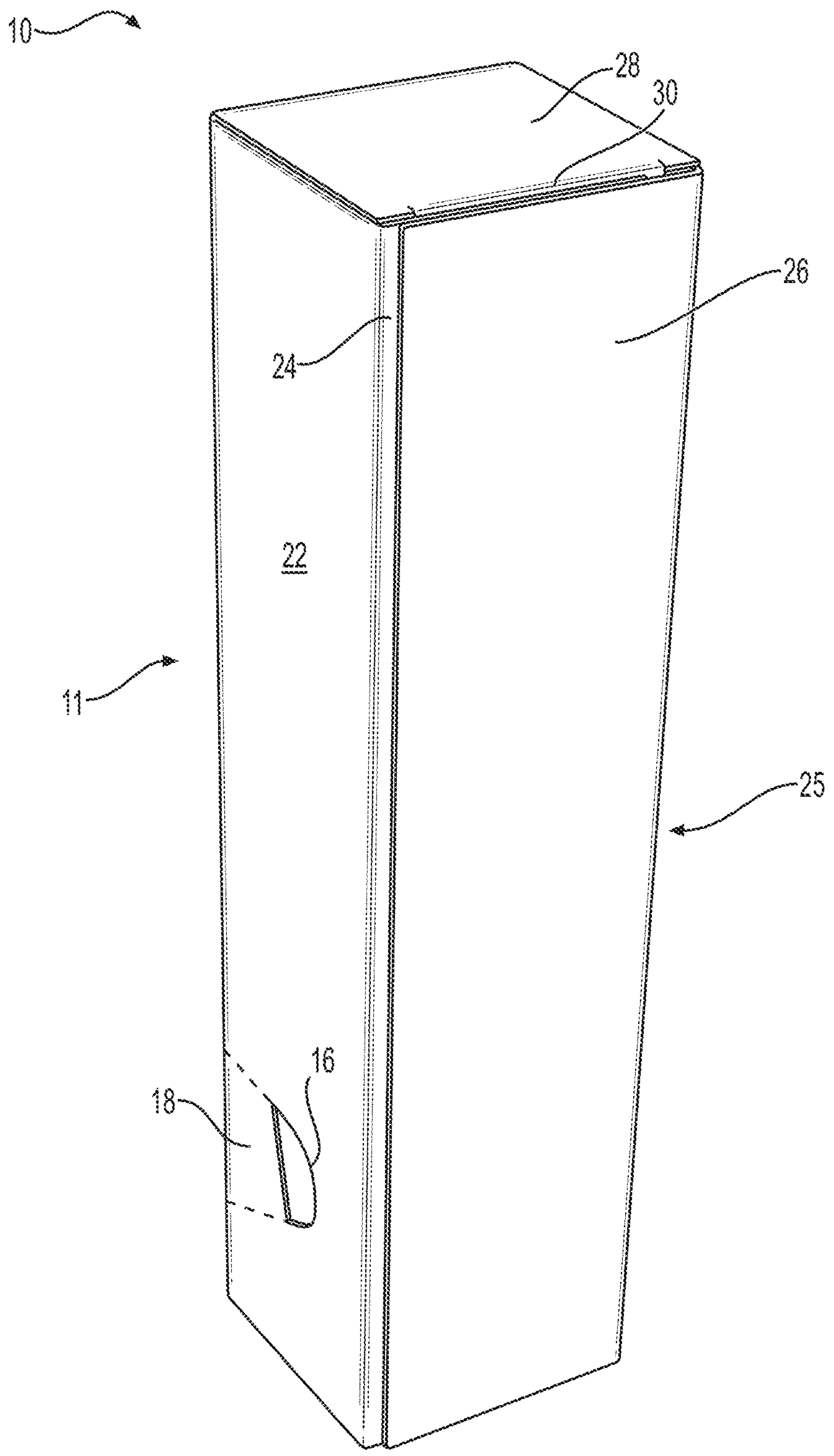
FIG. 2 is an illustration of a rear perspective view of the package, in accordance with an example embodiment.

FIG. 2 is an illustration of a rear perspective view of the package 10, in accordance with an example embodiment. In an example embodiment, the back wall 25 of the package 10 is formed from a first back panel 26 and a second back panel 24. In an example embodiment, the at least one top panel 28 includes a tuck panel 30 (seen in better detail in FIG. 6) along a top edge of the at least one top panel 28, where the tuck panel 30 can, for example, allow the top end of the package 10 to be opened and closed.

In an example embodiment, the package 10 includes sidewalls 11, where the sidewalls 11 include major sides of the overall package 10. In an example embodiment, the sidewalls 11 include the front panel 12, the first side panel 20, the second side panel 22 and the back wall 25 (e.g., the first back panel 26 and the second back panel 24).

Figure 3:
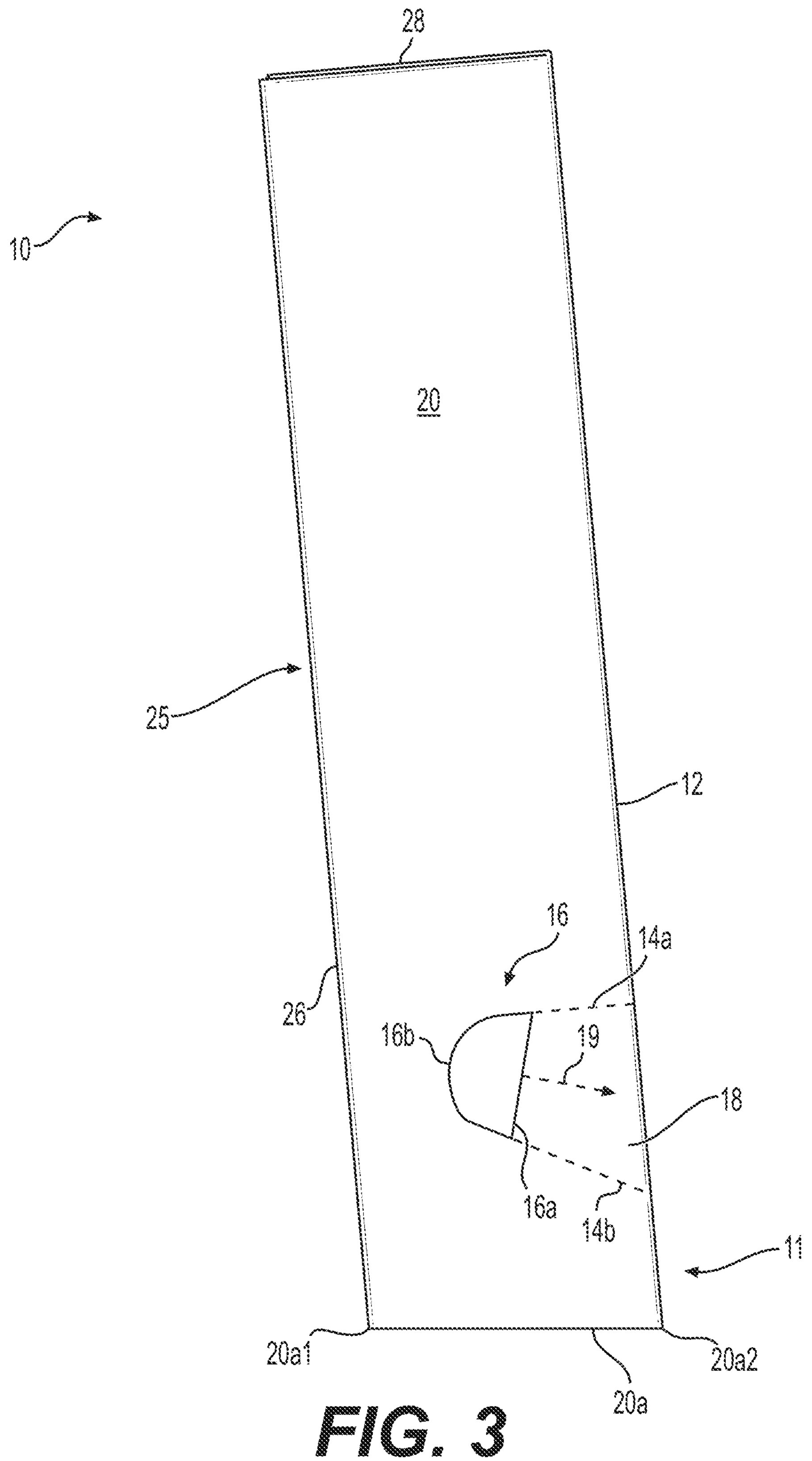
FIG. 3 is an illustration of a side view of the package, in accordance with an example embodiment.

FIG. 3 is an illustration of a side view of the package 10, in accordance with an example embodiment. In an example embodiment, the package 10 sits on an incline when placed on a flat surface. In an example embodiment, the package 10 leans backwards, relative to the front panel 12, as shown in FIG. 3. In an example embodiment, the leaning of the package 10 is accomplished by sloping a lower edge of sidewalls 11 that oppose each other on the package 10. In an example embodiment, the leaning of the package 10 is accomplished by sloping a lower edge 20*a* of the first side panel 20, and a lower edge 22*b* of the second side panel 22 (see FIG. 6), as explained in more detail in FIG. 6. By sloping the lower edge 20*a*, as an example, a first angle 20*a*1 between the lower edge 20*a* of the first side panel 20 and the first back panel 26 is made to be obtuse (greater than 90 degrees), whereas a second angle 20*a*2 between the lower edge 20*a* and the front panel 12 is made to be acute (less than 90 degrees), thereby causing the package 10 to lean backward relative to the front panel 12. In an example embodiment, a longitudinal length of the back wall 25 is shorter than a longitudinal length of the front panel 12. In an example embodiment, the sidewalls 11 of the package 10 lean backwards (inclines), relative to a location of at least a portion of the tear-off section 18 of the package 10. In an example embodiment, the sidewalls 11 of the package 10 lean backwards (inclines), relative to a location of a central portion of the tear-off section 18, such as a first portion 18*a* of the tear-off section 18 (see FIG. 6), defined by the front panel 12.

In an example embodiment, the side finger hole 16 is partially defined by a straight edge 16*a* that is part of the tear-off section 18. In an example embodiment, the straight edge 16*a* is on a side of the side finger hole 16 that faces a tear-off direction 19, where the straight edge 16*a* is about perpendicular to the tear-off direction 19. This facilitates a tearing off of the tear-off section 18. In an example embodiment, the tear-off direction 19 is an imaginary line that starts at the center of the straight edge 16*a*, and is about perpendicular to the straight edge 16*a*, and runs about equidistant between a first upper/side tear line 14*a* and a first lower/side tear line 14*b* (where the first upper/side tear line 14*a* and the first lower/side tear line 14*b* form part of the tear line 14, as shown in better detail in FIG. 6). The tear-off direction 19 emulates a direction that the straight edge 16*a* would most-easily travel, if the tear-off section 18 were to be torn off by pulling on the straight edge 16*a*.

In an example embodiment, the first side panel 20 defines a crescent or arcuate shaped portion 16*b* of the first side finger hole 16. In an example embodiment, the shape of the first side finger hole 16 is square, rectangular, circular, oval, or other shapes (where any of the finger holes can have the same or different shapes).

FIG. 4 is an illustration of a front perspective view of the package 10, in accordance with an example embodiment. In this configuration, the tear-off section 18 (FIGS. 1-3) has been removed from the package 10. In an example embodiment, the removed tear-off section 18 exposes one or more platform panels 36. In an example embodiment, the one or more platforms 41 are able to support consumer items for dispensing. In an example embodiment, the package 10 of FIG. 4 is used as a gravity-fed dispenser, where an initial stack of consumer items in the package 10 are removed one at a time from an opening 15 created by the removal of the tear-off section 18.

In an example embodiment, the one or more platform panels 36 includes a first platform panel 42 that is substantially flat along a width of the first platform panel 42. That is to say, a first end 42*a* of the first platform panel 42 is flat along a width-wise span of the first end 42*a* (level, relative to gravity), and the first end 42*a* is about flush with, higher than, or lower than a straight, front/lower edge 15*a* of the opening 15. In an example embodiment, a width-wise span of a second end 42*b* of the first platform panel 42 is substantially flat. In an example embodiment, while the first platform panel 42 is substantially flat along its width, the first platform panel 42 declines slightly, along a depth-wise span, from the first end 42*a* to the second end 42*b*, causing the second end 42*b* to be at a slightly lower elevation relative to the first end 42*a*. This can, for example, allow consumer items to remain in the package 10, prior to dispensing. In an example embodiment, the decline of the first platform panel 42 is described in more detail in relation to FIGS. 8 and 9.

In an example embodiment, the one or more platforms panels 36 further includes a second platform panel 44. In an example embodiment, the second platform panel 44 inclines upwards, from a first fold line 120 (that divides the first platform panel 42 and the second platform panel 44), thereby causing a first end 44*a* of the second platform panel 44 to be at a higher elevation than the first fold line 120. In an example embodiment, the first end 44*a* of the second platform panel 44 rests along the back wall 25 formed by the first back panel 26 and the second back panel 24. In an example embodiment, the first end 44*a* of the second platform panel 44 is indirectly connected to, or connected to, or adhesively connected to, the back wall 25.

In an example embodiment, lower side edge 15*b* and lower side edge 15*c* of the opening 15 incline, as the lower side edges 15*b*/15*c* extend toward the back wall 25. This causes at least a portion of a first lower end 20*b* of the first side panel 20 and a second lower end 22*a* of the second side panel 22 to extend above an elevation of the first platform panel 42. This can, for example, allow consumer items to remain contained within the package 10, prior to dispensing. In an example embodiment, an end 15*b*1 of the lower side edge 15*b* and an end 15*c*1 of the lower side edge 15*c* are about flush with the first end 42*a* of the first platform panel 42 and the front/lower edge 15*a* of the opening 15. This can, for example, allow consumer items to be removed from the package 10, by holding the item from the sides and pulling it out of the front of the package 10.

Figure 5:
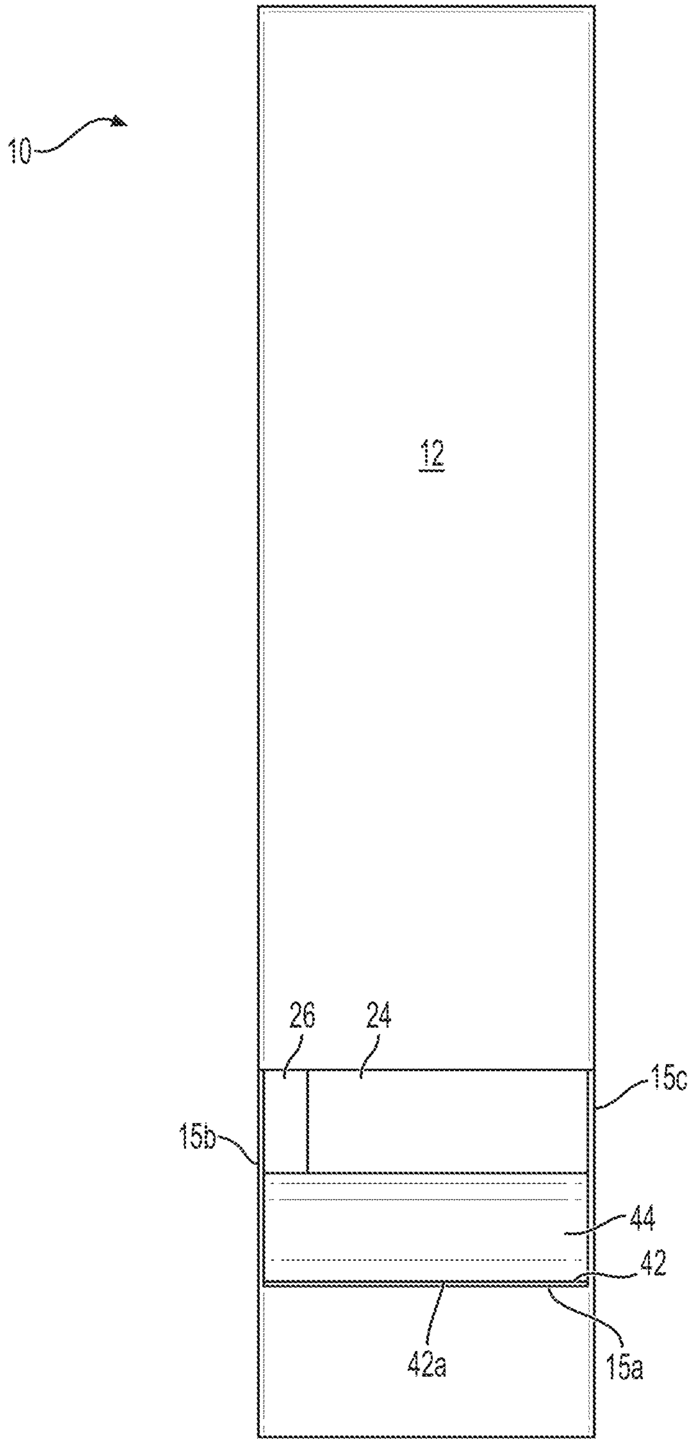
FIG. 5 is an illustration of a front view of the package, with the tear-off section torn off, in accordance with an example embodiment.

FIG. 5 is an illustration of a front view of the package 10, with the tear-off section 18 removed, in accordance with an example embodiment. In an example embodiment, in this view only the first end 42*a* of the first platform panel 42 can be seen, as the second end 42*b* of the first platform panel 42 and the first fold line 120 are at an elevation that is slightly below the first end 42*a*, and are therefore obscured from view.

Figure 6:
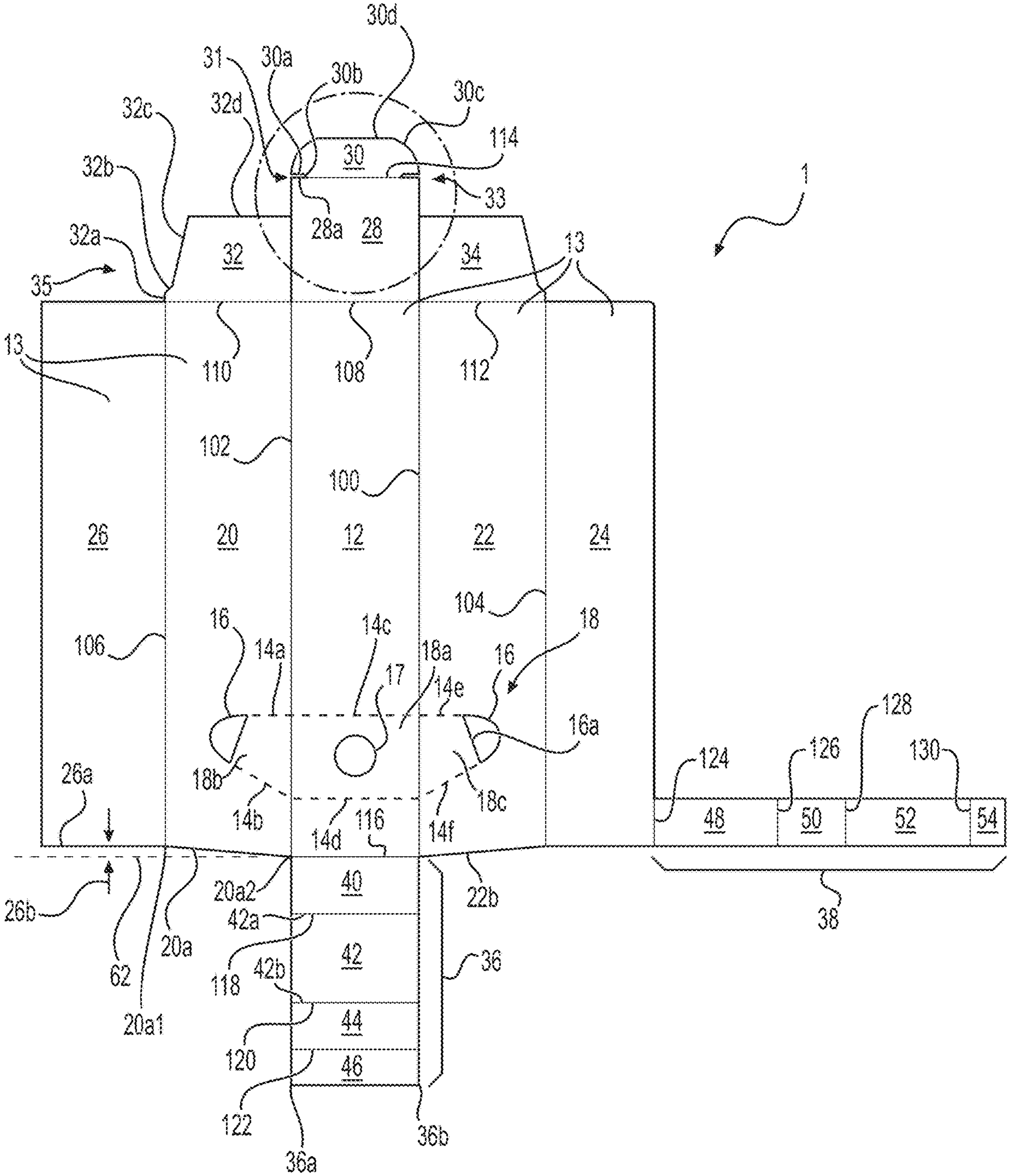
FIG. 6 is an illustration of a blank, in accordance with an example embodiment.

FIG. 6 is an illustration of a blank 1, in accordance with an example embodiment. In an example embodiment, the blank 1 can be folded and formed into the package 10, as described herein.

In an example embodiment, the blank 1 includes the one or more platform panels 36 extending from a lower end of the blank 1. In an example embodiment, the one or more platform panels 36 extend from a lower end of the front panel 12, along a second fold line 116. In an example embodiment, the one or more platform panels 36 extend from the lower end of the front panel 12, the first side panel 20, the second side panel 22, the first back panel 26, the second back panel 24, or combinations thereof. That is to say, the one or more platform panels 36 extend from the lower end of any one of these panels, or the one or more platform panels 36 extend from more than one of these panels, or all of these panels.

In an example embodiment, the one or more platform panels 36 includes the first platform panel 42 and the second platform panel 44. In an example embodiment, the one or more platform panels 36 includes the first platform panel 42, the second platform panel 44, a third platform panel 40 and a fourth platform panel 46. In an example embodiment, a third fold line 118 divides the first platform panel 42 from the third platform panel 40, and a fourth fold line 122 divides the second platform panel 44 and the fourth platform panel 46. In an example embodiment, the one or more platform panels 36 includes one singular platform panel, or only two platform panels, or only three platform panels. In an example embodiment, the one or more platform panels 36 includes more than four platform panels. In an example embodiment, the one or more platform panels 36 has a width (from a first end 36*a* to a second end 36*b*) that matches a width of the front panel 12. In an example embodiment, the first platform panel 42 has a greater length (from the first end 42*a* to the second end 42*b*) than the other panels of the one or more platform panels 36. In an example embodiment, the third platform panel 40 has a length that is about equal to a length between the second fold line 116 and a lower tear line 14*d* that is defined by the front panel 12.

In an example embodiment, the blank 1 includes sidewall panels 13 that are erected to form the sidewalls 11 of the package 10. In an example embodiment, the sidewall panels 13 include the first side panel 20 and the second side panel 22 on either side of the front panel 12, where a fifth fold line 102 and a sixth fold line 100 respectively divides the front panel 12 from the first side panel 20 and the second side panel 22. In an example embodiment, the sidewall panels 13 include a first back panel 26 and a second back panel 24. In an example embodiment, the first back panel 26 is connected to a side edge of the first side panel 20 and the second back panel 24 is connected to a side edge of the second side panel 22, where a seventh fold line 106 and a eighth fold line 104 respectively divides the first side panel 20 from the first back panel 26 and divides the second side panel 22 from the second back panel 24.

In an example embodiment, the tear-off section 18 is defined by one or more of the sidewall panels 13, or a lower end of one or more of the sidewall panels 13. In an example embodiment, the front panel 12 defines at least the first portion 18*a* of the tear-off section 18, where an upper tear line 14*c* and a lower tear line 14*d* at least partially define the first portion 18*a*. In an example embodiment, the first portion 18*a* is a center portion of the tear-off section 18. In an example embodiment, the upper tear line 14*c* and the lower tear line 14*d* are tear lines that are defined to be about straight, and are about parallel to each other. In an example embodiment, the first portion 18*a* defines the center finger hole 17. In an example embodiment, the first side panel 20 defines a second portion 18*b* of the tear-off section 18, where the first upper/side tear line 14*a* and the first lower/side tear line 14*b* at least partially defines the second portion 18*b*. In an example embodiment, the second side panel 22 defines a third portion 18*c* of the tear-off section 18, where a second upper/side tear line 14*e* and a second lower/side tear line 14*f* at least partially defines the third portion 18*c*. Other sizes and shapes of the tear-off section 18, and the tear lines, are contemplated.

In an example embodiment, the front panel 12 defines the tear-off section 18, or defines the first portion 18*a* of the tear-off section 18, in such a way that an ample portion of the front panel 12 remains available to display indicia information that includes marketing indicia, product information indicia, or combinations thereof. That is to say, in an embodiment, the tear-off section 18, or the first portion 18*a* of the tear-off section 18, monopolizes only part of the front panel 12, leaving an ample remaining portion of the front panel 12 available for displaying the indicia information.

In an embodiment, the sidewall panels 13 that defines the first portion 18*a* of the tear-off section 18, or which define the center portion of the tear-off section 18, have the one or more platform panels 36 extending from a lower edge of the same sidewall panel 13.

In an example embodiment, the blank 1 includes one or more foot panels 38. In an example embodiment, the one or more foot panels 38 extends from a lower end of the blank 1. In an example embodiment, the one or more foot panels 38 extend from a lower side of the blank 1. In an example embodiment, the one or more foot panels 38 extend from a lower side edge of the blank 1. In an example embodiment, the one or more foot panels 38 extend from a lower end of the second back panel 24. In an example embodiment, the one or more foot panels 38 extend from a lower end of the second back panel 24, where a ninth fold line 124 divides the second back panel 24 from the one or more foot panels 38. In an example embodiment, the one or more foot panels 38 extend from a lower end of the first back panel 26. In an example embodiment, the one or more foot panels 38 extend from a lower end of the second back panel 24, the first back panel 26, the first side panel 20, the second side panel 22, the front panel 12, or combinations thereof. That is to say, in an example embodiment, the one or more foot panels 38 extend from a lower end of one of these panels, or extend from a lower end of more than one of these panels, or a lower end of all of these panels.

In an example embodiment, the one or more foot panels 38 can be folded and positioned under at least a portion of the one or more platform panels 36, so that at least one of the one or more foot panels 38 can at least partially support at least a portion of the one or more platform panels 36. Some example embodiments may include less foot panels that as shown in the figures. In an example embodiment, the one or more foot panels 38 includes a first foot panel 48, a second foot panel 50, a third foot panel and a fourth foot panel 54, where a tenth fold line 126 divides the first foot panel 48 from the second foot panel 50, an eleventh fold line divides the second foot panel 50 from the third foot panel 52 and a twelfth fold line 130 divides the third foot panel 52 from the fourth foot panel 54. In an example embodiment, the first foot panel 48 and the third foot panel 52 are longer than the second foot panel 50 and the fourth foot panel 54. In an example embodiment, the first foot panel 48 and the third foot panel 52 have a length that is about equal to a width of the first side panel 20 and the second side panel 22. In an example embodiment, the one or more foot panels 38 all have a same width. In an example embodiment, the one or more foot panels 38 include only one singular foot panel, or only two foot panels, or only three foot panels. In an example embodiment, the one or more foot panels 38 includes more than four foot panels.

In an example embodiment, the lower edge of a pair of the sidewall panels 13, which are configured to be erected into sidewalls 11 that oppose each other, are sloped in order to cause the package 10 to lean, as described above in relation to FIG. 3. In an example embodiment, the lower edge 20*a* of the first side panel 20 and the lower edge 22*b* of the second side panel 22 are sloped, in an upward direction relative to the second fold line 116 (lower edge) of the front panel 12, causing the lower edge 20*a* and the lower edge 22*b* to be at least partially offset (see for instance the offset 26*b*), relative to a lower edge of the front panel 12 delineated by the second fold line 116. That is to say, the lower edge 20*a* and the lower edge 26*a* do not entirely extend down to an imaginary line 62 that runs through, and is collinear with, the second fold line 116. In an example embodiment, as described above, the offset 26*b* can be created by making the first angle 20*a*1 between the lower edge 20*a* and the seventh fold line 106 obtuse (greater than 90 degrees), and making the second angle 20*a*2 between the lower edge 20*a* and the fifth fold line 102 acute (less than 90 degrees). In an example embodiment, the lower edge 22*b* of the second side panel 22 is sloped at a same angle and an opposing direction as the lower edge 20*a* of the first side panel 20, as shown in FIG. 6. In an example embodiment, by sloping the lower edge 20*a* and the lower edge 22*b*, the back wall 25 (the first back panel 26 and the second back panel 24) is shorter than the front panel 12, thereby causing the package 10 lean.

In an example embodiment, the at least one top panel 28 extends from a top portion of the blank 1. In an example embodiment, the at least one top panel 28 extends from a top portion of the front panel 12, where a thirteenth fold line 108 divides the front panel 12 and the at least one top panel 28. In an example embodiment, the at least one top panel 28 extends from a top portion of one or more of the sidewall panels 13. In an example embodiment, the tuck panel 30 is on an end of the at least one top panel 28, where a fourteenth fold line 114 divides the at least one top panel 28 from the tuck panel 30. In an example embodiment, the tuck panel 30 includes curved corner edges 30*c* between a flat end edge 30*d*. In an example embodiment, a first side slit 31 and a second side slit 33 are included on ends of the fourteenth fold line. The first side slit 31 is defined by an edge 30*a* of the tuck panel 30 and an edge 28*a* of the at least one top panel 28. In an example embodiment, the edge 30*a* of the tuck panel is curved as the edge 30*a* approaches an end corner 30*b* of the first side slit 31, as shown in better detail in FIG. 7. In an example embodiment, the second side slit 33 includes the same, but symmetrical, features as the first side slit 31.

In an example embodiment, the blank 1 includes a first dust panel 32 and a second dust panel 34 extending from a top end of the blank 1. In an example embodiment, the first dust panel 32 and the second dust panel 34 extend from top edges of the first side panel 20 and the second side panel 22, where a fifteenth fold line 110 and a sixteenth fold line 112 respectively divide the first side panel 20 from first dust panel 32, and divide the second side panel 22 from the second dust panel 34. In an example embodiment, the first dust panel 32 and the second dust panel 34 are not directly connected to the at least one top panel 28. In an example embodiment, the first dust panel 32 includes a cut-out corner 35. The cut-out corner includes a first sloped edge 32*b* and a second sloped edge 32*c* between a vertical side edge 32*a* and a top edge 32*d*. In an example embodiment, the second sloped edge 32*c* has a greater slope angle than the first sloped edge 32*b*, relative to the top edge 32*d*. In an example embodiment, the second dust panel 34 includes the same features as the first dust panel 32.

Figure 7:
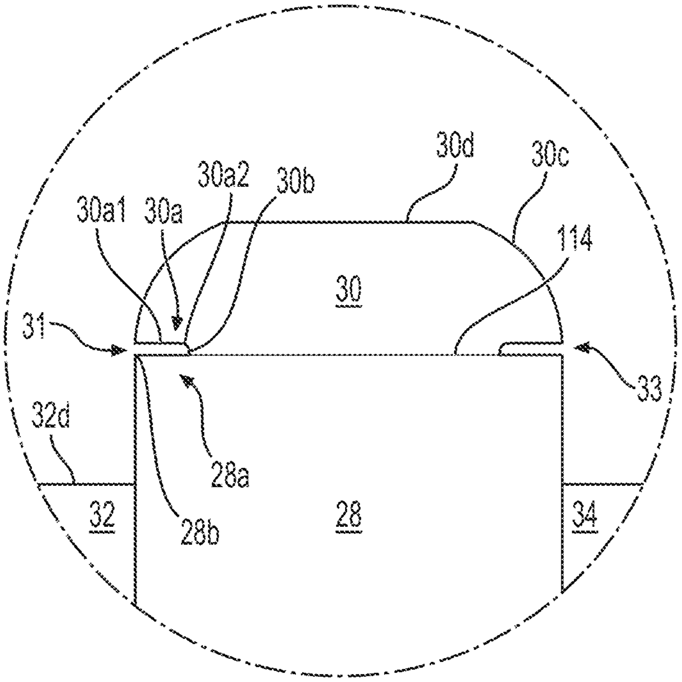
FIG. 7 is an illustration of a magnified view of the top panel of the blank, in accordance with an example embodiment.

FIG. 7 is an illustration of a magnified view of the at least one top panel 28 of the blank, in accordance with an example embodiment. In an example embodiment, the first side slit 31 is defined in part by an edge 30*a* of the tuck panel 30, where the edge 30*a* includes a straight portion 30*a*1 and a curved portion 30*a*2. In an example embodiment, the curved portion 30*a*2 is curved in a downward direction, toward the end corner 30*b* that is on the fourteenth fold line 114. In an example embodiment, the curved portion 30*a*2 allows the tuck panel 30 to be more easily released from the package 10. In an example embodiment, the first side slit 31 is further defined by the edge 28*a* of the at least one top panel 28, where the edge 28*a* is straight from the end corner 30*b* to a side edge 28*b* of the at least one top panel 28.

Figure 8:
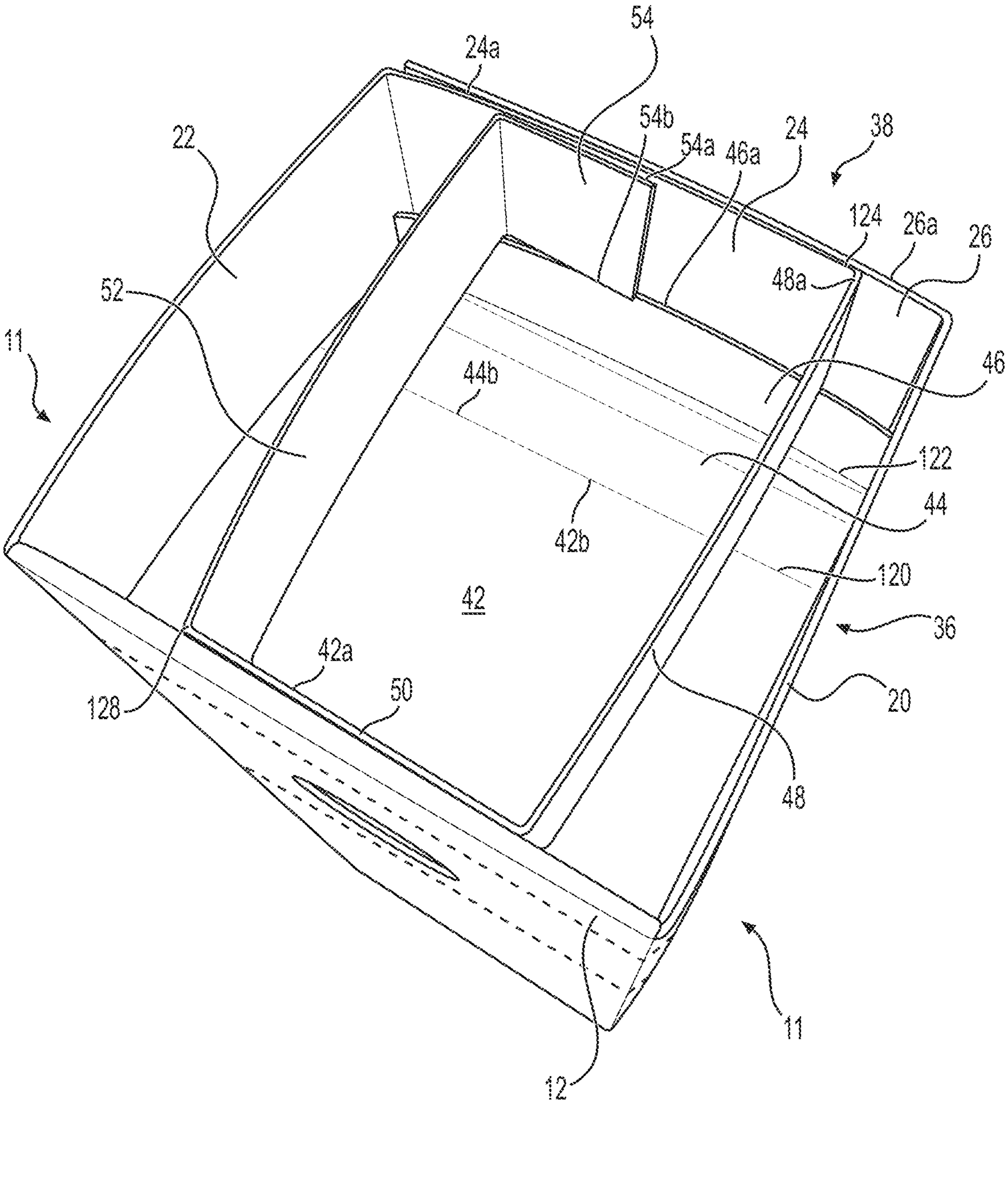
FIG. 8 is an illustration of a bottom perspective view of the package, in accordance with an example embodiment.

FIG. 8 is an illustration of a bottom perspective view of the package 10, in accordance with an example embodiment. In an example embodiment, the first back panel 26 overlays an outer surface of the second back panel 24, where the first foot panel 48 is folded along the ninth fold line 124 to extend toward the front panel 12. In an example embodiment, the second foot panel extends along an inner surface of the second foot panel 50 and the third foot panel 52 is folded along the eleventh fold line 128 to extend the third foot panel 52 toward the second back panel 24. In an example embodiment, the fourth foot panel 54 is folded along the twelfth fold line 130 to allow the fourth foot panel 54 to extend along the second back panel 24.

Figure 9:
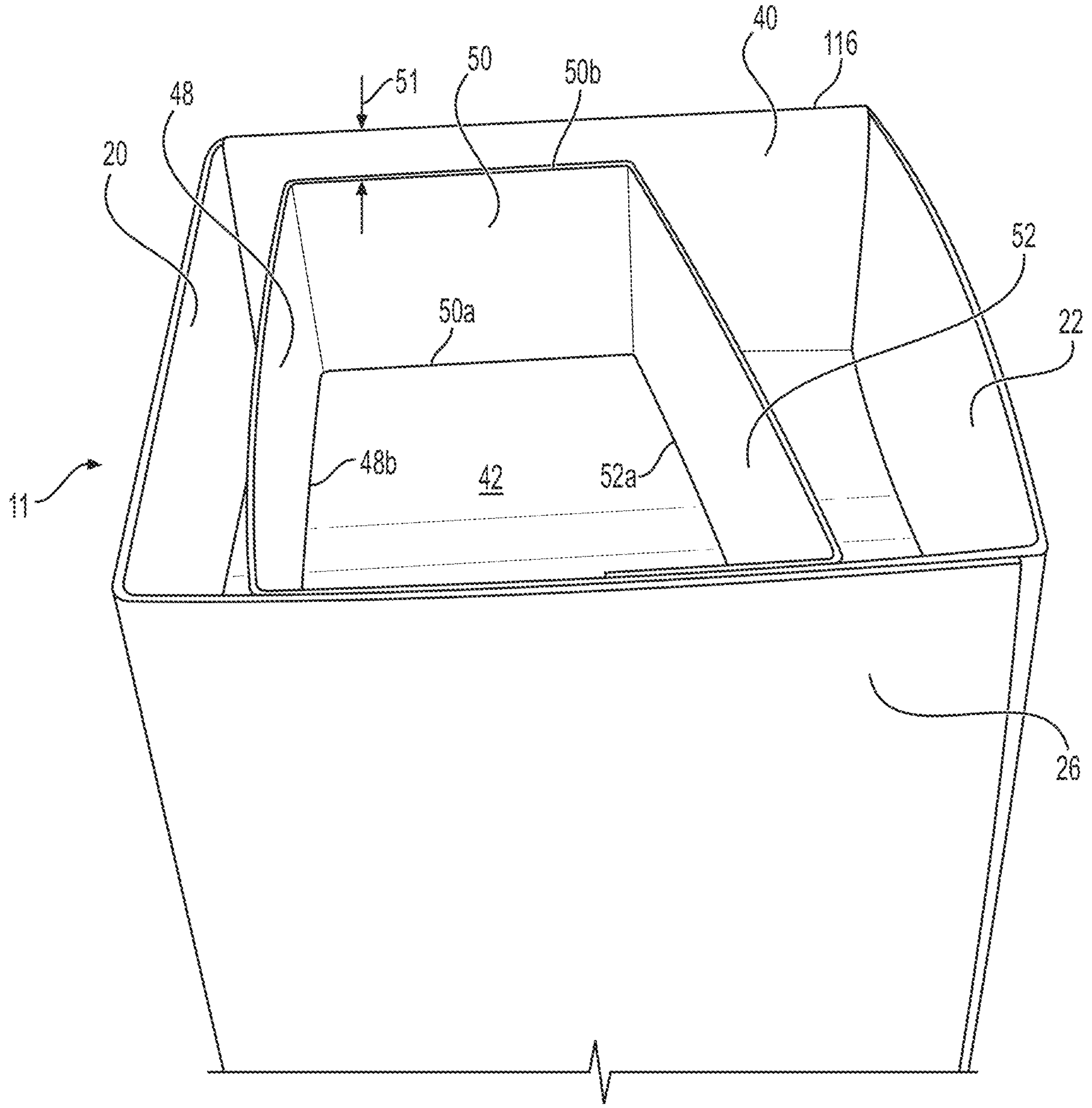
FIG. 9 is an illustration of another bottom view of the package, in accordance with an example embodiment.

In an example embodiment, the second foot panel 50 and the third platform panel 40 are in contact with each other (as seen in better detail in FIG. 9). In an example embodiment, the second foot panel 50 and the third platform panel 40 are connected to, or adhesively connected to, each other. In an example embodiment, the fourth foot panel 54 and the second back panel 24 are in contact with each other. In an example embodiment, the fourth foot panel 54 and the second back panel 24 are connected to, or adhesively connected to, each other. In an example embodiment, a lower edge 54*a* of the fourth foot panel 54 is about flush with a lower edge 24*a* of the second back panel 24.

In an example embodiment, at least one of the one or more foot panels 38 at least partially supports at least one of the one more platform panels 36. In an example embodiment, the first foot panel 48 or the third foot panel 52, or both of these panels 48/52, at least partially supports the first platform panel 42. In an example embodiment, the first foot panel 48 or the third foot panel 52, or both of these panels 48/52, are positioned to run along a length of a bottom of the first platform panel 42, to at least partially support the first platform panel 42. In an example embodiment, at least a portion of the one or more foot panels 38 spans between sidewalls 11 that oppose each other. In an example embodiment, at least one first portion of the one or more foot panels 38 extends to a lowest-most elevation of the package 10, such that the at least one first portion directly contacts a surface, if the package 10 is placed on the surface in a dispensing orientation (with top panel 28 facing up). In an example embodiment, the one or more foot panels 38, or portions of the one or more foot panels 38, or weight-bearing portions of the one or more foot panels 38 (that at least partially support the one or more platform panels 36, or support other structure of the package 10), have major surfaces that are substantially parallel with gravity, or normal with a surface, if the package 10 is placed on the surface in the dispensing orientation. In an example embodiment, a lower edge 48*a* of the first foot panel 48 is flush with the lower edge 26*a* of the first back panel 26.

In an example embodiment, the fourth platform panel 46 is extended along a back surface of the first back panel 26 and the second back panel 24, where a first end 46*a* of the fourth platform panel 46 contacts an upper edge 54*b* of the fourth foot panel 54. In an example embodiment, the fourth foot panel 54 at least partially supports the fourth platform panel 46. In an example embodiment, the fourth platform panel 46 is connected to, or adhesively connected to, the first back panel 26 and the second back panel 24. In an example embodiment, the fourth platform panel 46 remains unconnected to the first back panel 26 and the second back panel 24, and instead the fourth platform panel 46 rests against the first back panel 26 and the second back panel 24.

In an example embodiment, only the first end 46*a* of the fourth platform panel 46 contacts the one or more foot panels 38, whereas a remaining portion of the fourth platform panel 46 does not contact the one or more foot panels 38 once the package 10 is assembled. In an example embodiment, only a second end 44*b* of the second platform panel 44 contacts the one or more foot panels 38, whereas a remaining portion of the second platform panel 44 does not contact the one or more foot panels 38 once the package 10 is assembled. In an example embodiment, the second platform panel 44 does not contact the one or more foot panels 38 once the package 10 is assembled.

In an example embodiment, the one or more platform panels 36 at least partially forms a bottom surface of the package 10. In an example embodiment, a combination of the one or more platform panels 36 and the one or more foot panels 38 forms a "false bottom" structure, or a "raised platform" structure, at the lower end of the package 10.

In an example embodiment, the package 10 includes a flat bottom-most surface (not shown) that covers and conceals the one or more platform panels 36 and the one or more foot panels 38 from a bottom view of the package 10.

In an example embodiment, during an assembly of the package 10 a limited amount of adhesive is used, such that only the following panels are adhesively connected for the package 10 to be fully assembled: (1) the first side panel 20 is connected to the second side panel 22, for instance, by virtue of the first back panel 26 being adhesively connected to the second back panel 24; and (2) the fourth foot panel 54 is connected to the back wall 25, for instance, by virtue of the fourth foot panel 54 being adhesively connected to the second back panel 24. This limited amount of adhesive allows the package 10 to be assembled more easily, with less steps and less materials.

FIG. 9 is an illustration of another bottom view of the package 10, in accordance with an example embodiment. In an example embodiment, the third platform panel 40 is folded along the second fold line 116 so that the third platform panel 40 extends along an inner surface of a lower end of the front panel 12. In an example embodiment, as described above, the second foot panel 50 is connected to, or adhesively connected to, the third platform panel 40. In an example embodiment, the upper edge 50*a* of the second foot panel 50 is positioned to be about flush with the front/lower edge 15*a* of the opening 15 (as shown in at least FIG. 4), such that a gap 51 exists between a lower edge 50*b* of the second foot panel 50 and the second fold line 116. In an example embodiment, the existence of the gap 51, where no gap exists between the lower edge 54*a* of the fourth foot panel 54 and the lower edge 24*a* of the second back panel 24, and no gap exists between the lower edge 48*a* of the first foot panel 48 and the lower edge 26*a* of the first back panel 26 (see FIG. 8), causes the upper edge 48*b* of the first foot panel 48 and the upper edge 52*a* of the third foot panel 52 to be slightly declined, from the front of the package 10 at the front panel 12 to the back of the package 10 at the back wall 25, thereby causing the first platform panel 42 to be slightly declined from the first end 42*a* of the first platform panel 42 to the second end 42*b* of the first platform panel 42.

In an example embodiment, and in the configuration of FIG. 9, the package 10 experiences a greater overall rigidity, and a greater overall strength, by virtue of the one or more platform panels 36 being fitted into, and stabilized within, an end of the package 10. In an example embodiment, the structure of the one or more foot panels 38 at least partially assists in stabilizing the one or more platform panels 36 within the package 10. In an example embodiment, an adhesive is used to at least partially assist in stabilizing the one or more platform panels 36 within the package 10. Other example embodiments may include adhesive between additional panels for, as an example, an extra rigidity of the package 10.

Figure 10:
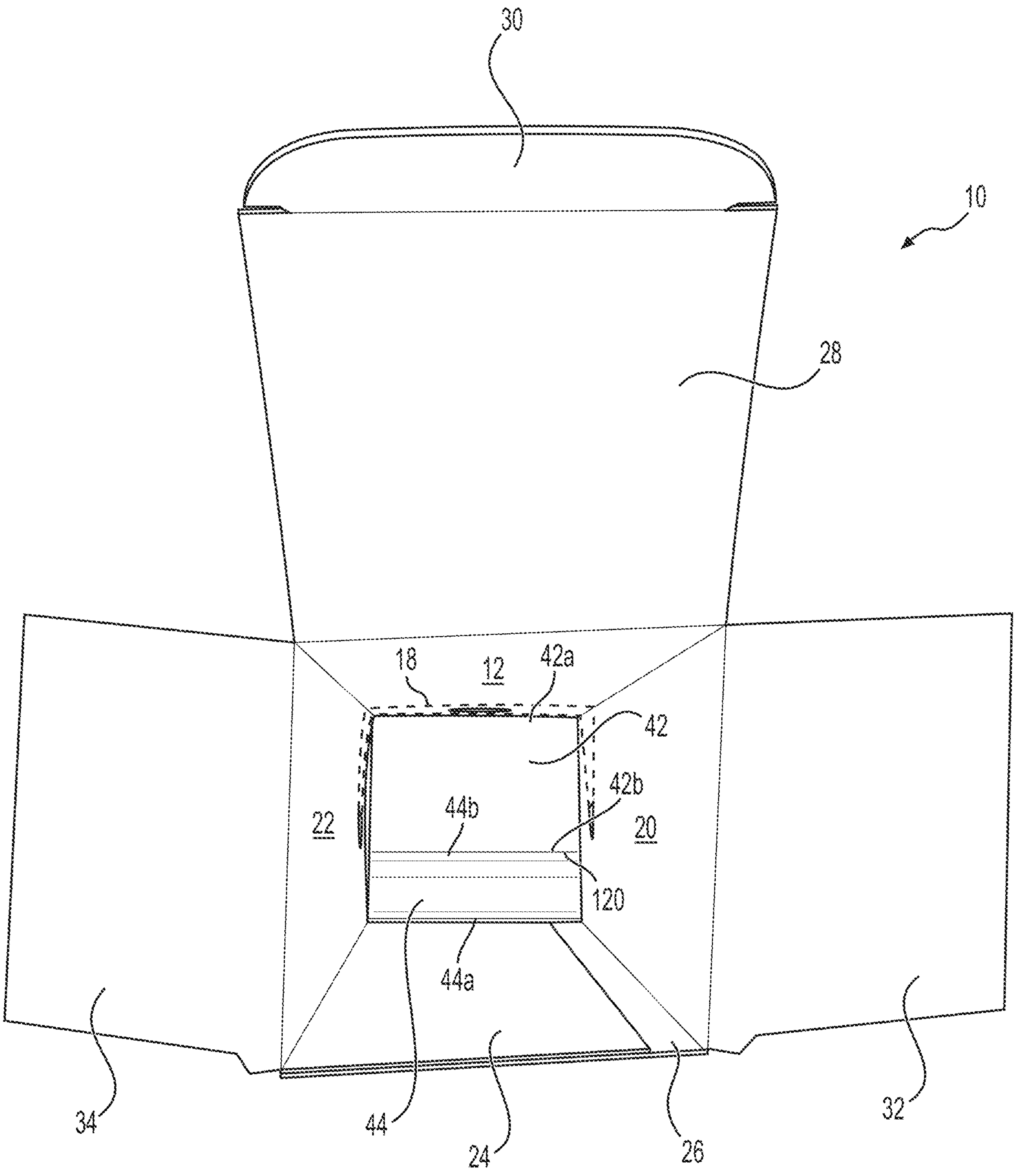
FIG. 10 is an illustration of a top view of the opened package, in accordance with an example embodiment.

FIG. 10 is an illustration of a top view of the package 10 in an opened configuration, in accordance with an example embodiment. In this configuration, the package 10 may be loaded or re-loaded with consumer items. In an example embodiment, the package 10 is loaded or re-loaded with consumer items by dropping the consumer items down into the package 10 from the top. In an example embodiment, once the tear-off section 18 is removed, consumer items on the first platform panel 42 and the second platform panel 44 will be displayed through the opening 15.

In an example embodiment, a top end of the package 10 is not able to be opened and closed. In this embodiment, the top end is sealed, and not able to be re-opened. In an example embodiment, the top end is configured to be sealed, and is re-opened by tearing the top end of the package 10.

Figure 11:
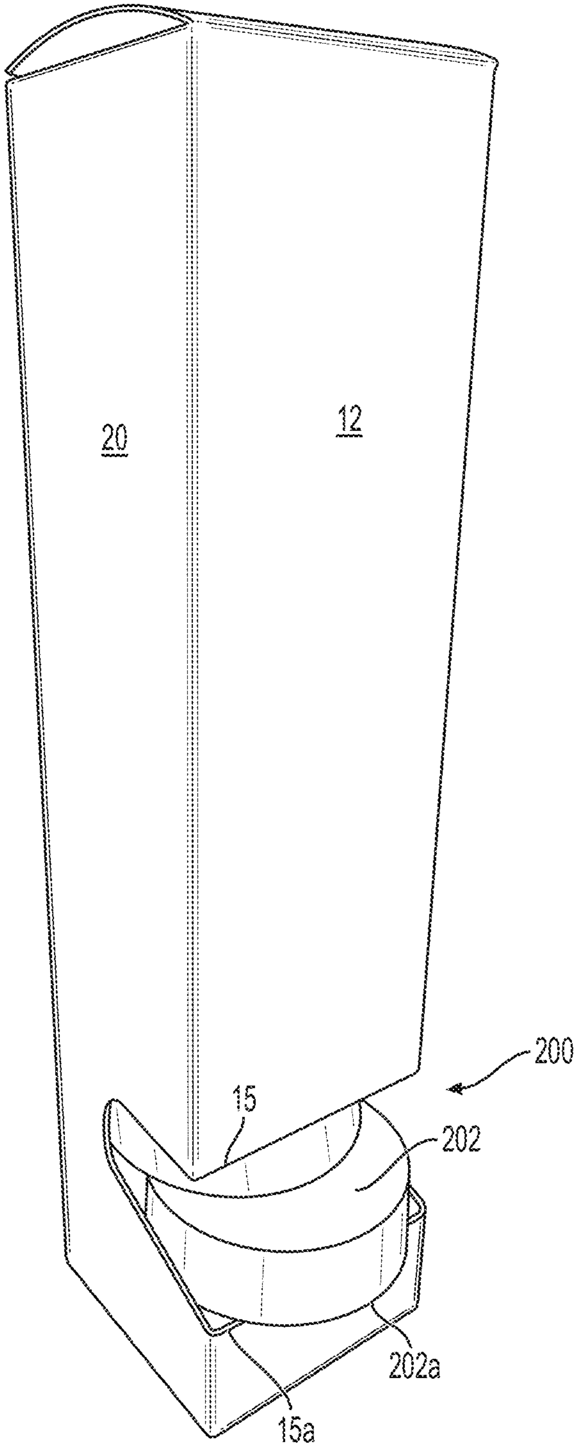
FIG. 11 is an illustration of the package with one or more consumer items being displayed within the opening, in accordance with an example embodiment.

FIG. 11 is an illustration of the package with one or more consumer items 200 being displayed within the opening 15, in accordance with an example embodiment. In an example embodiment, the consumer items 200 are canister shaped items with a flat upper and lower surface. In an example embodiment, a bottom-most consumer item 202 rests on the first platform panel 42 in a slightly extended position. That is to say, a first end 202*a* of the bottom-most consumer item 202 extends beyond the front/lower edge 15*a* of the opening 15. This is because, in an example embodiment, a back-most end (obscured in FIG. 11) of the bottom-most consumer item 202 slides down the second platform panel 44, and comes to rest at or near the second end 44*b* of the second platform panel 44.

In an example embodiment, the consumer items 200 are cans containing moist a tobacco product, such as moist smokeless tobacco, tobacco pouches, or any other type of tobacco products. The package 10 may also be used for any other types of products. In an example embodiment, the opening 15 of the package 10 is large enough to allow only one consumer item 200 to be dispensed from the package 10 at a time. In an example embodiment, the opening 15 is sized to allow two or more consumer items 200 to be removed from the package 10 at a time.

Figure 12:
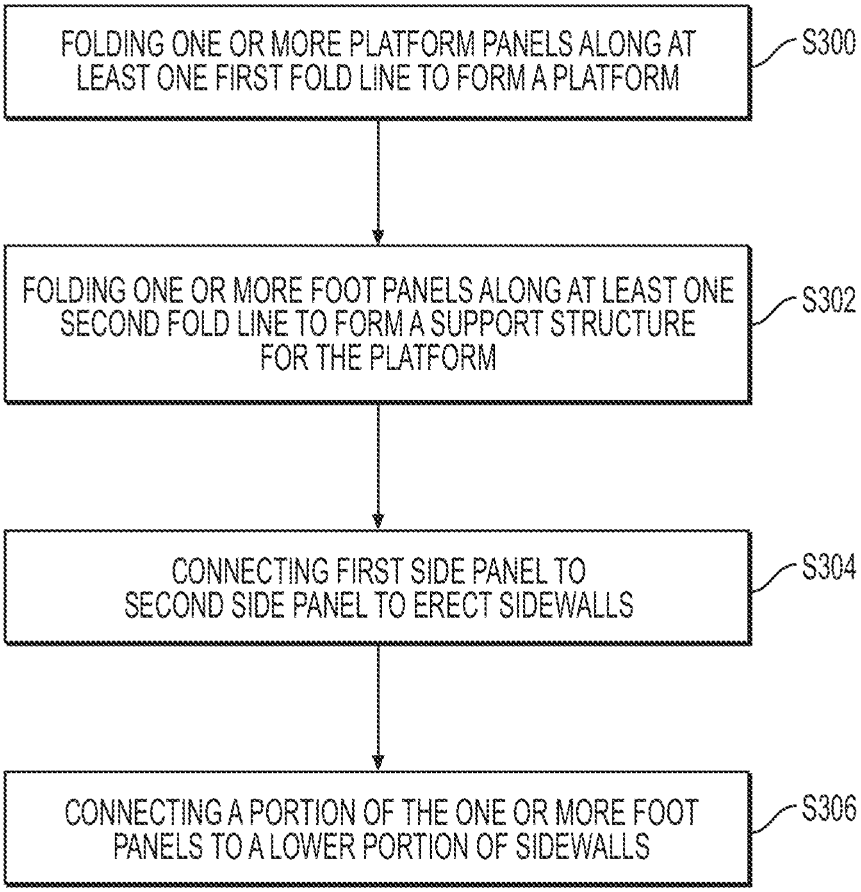
FIG. 12 is a flowchart of a method of forming the package from the blank, in accordance with an example embodiment.

FIG. 12 is a flowchart of a method of forming the package 10 from the blank 1, in accordance with an example embodiment. In an example embodiment, the method includes, in step S300, folding one or more platform panels 36 along at least one first fold line to form a platform. In an example embodiment, the first platform panel 42 and the second platform panel 44 form the platform. In an example embodiment, the one or more platform panels 36 extend from a lower end of the blank 1.

In an example embodiment, the method includes, in step S302, folding one or more foot panels 38 along at least one second fold line to form a support structure for the platform. In an example embodiment, the one or more platform panels 38 extend from the lower end of the blank 1. In an example embodiment, the one or more platform panels 38 extend from a lower edge, or a lower side edge, of the blank 1. In an example embodiment, the support structure at least partially supports at least a portion of the one or more platform panels 36. In an example embodiment, at least a portion of the support structure is below at least a portion of the one or more platform panels 36 of the package 10, once the package 10 is assembled. In an example embodiment, a bottom of the package 10 is at least partially formed by the one or more platform panels 36 and the one or more foot panels 38.

In an example embodiment, the method includes, in step S304, connecting the first side panel 20 to the second side panel 22 to erect sidewalls 11 of the package 10. In an example embodiment, this is accomplished by connecting the first back panel 26 to the second back panel 24. In an example embodiment, this is accomplished by connecting the first back panel 26 directly to the second side panel 22. In an example embodiment, this is accomplished by connecting the second back panel 24 directly to the first side panel 20.

In an example embodiment, the method includes, in step S306, connecting at least one portion of the one or more foot panels 38 to a lower portion of at least one sidewall 11. In an example embodiment, an end portion of the one or more foot panels 38 is adhesively connected to the lower portion of the at least one sidewall 11. In an example embodiment, the fourth foot panel 54 is adhesively connected to the lower portion of the at least one sidewall 11. In an example embodiment, the fourth foot panel 54 is adhesively connected to the lower portion of the back wall 25 of the package 10.

In an example embodiment, a lower end of the package 10 includes the tear-off section 18 that is configured to be torn off of the package 10. In an example embodiment, the package 10 is closed by folding the top panel 28 and tuck panel 30 along fold lines to close the package 10. In an example embodiment, an order that the method steps are performed in can be any order.

In an example embodiment, the blank 1 and/or the package 10 are formed of a material that includes at least one of cardboard, paperboard, paper, pulp, cellulose, plastic, polymer, foil, metal, or combinations thereof.

In the example embodiments described here, elements or panels that are adhesively connected to each other, are done so via the use of an adhesive, tape, pressure sensitive tape, glue, paste, rubber cement, mucilage, gum, a polymer, or combinations thereof.

Example embodiments having thus been described, it will be obvious that the same may be varied and modified in many ways. Such variations and modifications are intended to be included within the scope of the following claims.

What is claimed is:

1. A method of forming a blank, comprising:

defining a plurality of fold lines that divide the blank into a plurality of sidewall panels, each of the plurality of sidewall panels having a longitudinal length;

forming at least one platform panel on a bottom end of the plurality of sidewall panels; and forming at least one foot panel on a first side edge of a first sidewall panel, of the plurality of sidewall panels, near the bottom end, the first side edge running along the longitudinal length of the first sidewall panel, the at least one foot panel being configured to at least partially support the at least one platform panel once the blank is folded into an assembled package.

2. The method of claim 1, wherein the forming of the at least one foot panel forms the at least one foot panel to have a first longitudinal length that is perpendicular to a second longitudinal length of the at least one platform panel.

3. The method of claim 1, wherein the forming of the at least one platform panel forms the at least one platform panel to extend away from the bottom end in a first direction, and the forming of the at least one foot panel forms the at least one foot panel to extend away from the first side edge in a second direction, the first direction and the second direction being perpendicular to each other.

4. The method of claim 1, wherein the forming of the at least one foot panel forms such that the at least one foot panel is configured to be folded under the at least one platform so that at least a portion of an upper edge of the at least one foot panel directly contacts and at least partially supports at least a portion of the at least one platform panel.

5. The method of claim 4, wherein the forming of the at least one foot panel forms the at least one foot panel to hold the at least one platform panel above a bottom edge of the plurality of sidewall panels once the blank is folded into the assembled package, the plurality of sidewall panels and at least a portion of the at least one platform panel forming a false bottom near the bottom end of the assembled package.

6. The method of claim 1, wherein the forming of the at least one foot panel forms the at least one foot panel to hold the at least one platform panel above a bottom edge of the plurality of sidewall panels once the blank is folded into the assembled package, the plurality of sidewall panels and at least a portion of the at least one platform panel forming a false bottom near the bottom end of the assembled package.

7. The method of claim 6, wherein the forming of the at least one foot panel forms such that at least a portion a lower edge of at least one foot panel helps form a lowest-most surface of the assembled package.

8. The method of claim 1, wherein the forming of the at least one platform panel forms the at least one platform panel to include a first platform panel and a second platform panel, the first platform panel being directly connected to a bottom edge of a second sidewall panel of the plurality of sidewall panels, the second platform panel being configured to lay flat and directly support one or more consumer products within an interior of the assembled package.

9. The method of claim 8, wherein the forming of the at least one foot panel forms such that a portion of an upper edge of the at least one foot panel contacts and supports a distal end edge of the at least one platform panel once the blank is folded into the assembled package.

10. The method of claim 9, wherein the forming of the at least one foot panel forms such that a distal portion of the at least one foot panel is configured to be adhesively connected to an inner surface of at least one of the plurality of sidewall panels once the blank is folded into the assembled package.

11. The method of claim 8, wherein the forming of the at least one platform panel forms the at least one platform panel to include a third platform panel and a fourth platform panel, the fourth platform panel being on a distal end of the at least one platform panel, the first platform panel and the fourth platform panel having major surfaces that are configured to respectively lie against the second sidewall panel and a third sidewall panel, of the plurality of sidewall panels, once the blank is folded into the assembled package.

12. The method of claim 11, wherein the forming of the at least one platform panel forms such that the third platform panel is configured to incline upward with a first end of the third platform panel contacting the third sidewall panel once the blank is folded into the assembled package.

13. The method of claim 11, wherein the forming of the at least one foot panel forms such that a portion of an upper edge of the at least one foot panel contacts and supports a distal end edge of the at least one platform panel once the blank is folded into the assembled package.

14. The method of claim 1, wherein the forming of the at least one foot panel forms such that a distal portion of the at least one foot panel is configured to be adhesively connected to an inner surface of at least one of the plurality of sidewall panels once the blank is folded into the assembled package.

15. The method of claim 1, wherein the forming of the at least one foot panel forms such that the at least one foot panel is directly connected to at least one back sidewall panel of the plurality of sidewall panels.

16. The method of claim 15, wherein the forming of the at least one platform panel forms a proximal end of the at least one platform panel to be connected to a front sidewall panel of the plurality of sidewall panels, a distal end of the at least one platform panel being configured to lean against the at least one back sidewall panel of the assembled package.

17. The method of claim 16, wherein a first longitudinal length of the front sidewall panel is longer than a second longitudinal length of the at least one back sidewall panel.

18. The method of claim 17, further comprising:

defining a tear-off section near the bottom end, at least a portion of the tear-off section being defined by the front sidewall panel.

19. The method of claim 1, wherein the forming of the at least one platform panel forms the at least one platform panel to be connected to a front sidewall panel of the plurality of sidewall panels, a first longitudinal length of the front sidewall panel being longer than a second longitudinal length of remainder of the plurality of sidewall panels.

20. The method of claim 1, wherein the forming of the at least one foot panel forms the at least one foot panel to be directly connected to a first back sidewall panel of the plurality of sidewall panels, the first back sidewall panel and a second back sidewall panel, of the plurality of sidewall panels, having a first longitudinal length that is shorter than a second longitudinal length of a respective one of a remainder of the plurality of sidewall panels.

21. The method of claim 1, wherein the forming of the at least one foot panel forms the at least one foot panel to be directly connected to at least one back sidewall panel of the plurality of sidewall panels, the at least one back sidewall panel having a first longitudinal length that is shorter than a second longitudinal length of a respective one of a remainder of the plurality of sidewall panels, the plurality of sidewall panels of the assembled package being inclined towards the at least one back sidewall panel.

22. The method of claim 21, further comprising:

defining a tear-off section near the bottom end of at least some of the plurality of sidewall panels, at least a portion of the tear-off section being defined by a front sidewall panel of the plurality of sidewall panels, the front sidewall panel and the at least one back sidewall panel being on opposing sides of the assembled package.

23. The method of claim 1, further comprising:

defining a tear-off section near the bottom end of at least some of the plurality of sidewall panels.

24. The method of claim 23, wherein the defining defines the tear-off section on at least three of the plurality of sidewall panels.

25. The method of claim 23, wherein at least a center portion of the tear-off section is defined by a second sidewall panel, of the plurality of sidewall panels, the at least one platform panel being directly connected to a bottom edge of the second sidewall panel.

26. The method of claim 1, wherein the forming of the at least one platform panel forms the at least one platform panel to extend from a first bottom edge of one of the plurality of sidewall panels, the at least one platform panel including a first platform panel, a second platform panel at a first end of the first platform panel, a third platform panel at a second end of the first platform panel, the third platform panel directly connecting the first platform panel to the plurality of sidewall panels, and a fourth platform panel connected to the second platform panel, the first platform panel having a greater length than the second platform panel, the third platform panel and the fourth platform panel.

27. The method of claim 1, wherein the forming of the at least one foot panel forms the at least one foot panel to include multiple foot panels that are connected to each other end to end in a first direction, the first direction extending the multiple foot panels away from the first side edge.

28. The method of claim 27, wherein the forming of the at least one foot panel forms the multiple foot panels to have a width that is the same along the multiple foot panels in the first direction, the width being perpendicular to the first direction.

29. The method of claim 1, wherein the forming of the at least one platform panel forms such that the at least one platform panel is configured to support consumer products within an interior of the assembled package, once the blank is folded into the assembled package.

30. The method of claim 1, further comprising:

forming a top panel and a pair of dust panels on respective top edges of the plurality of sidewall panels, wherein each one of the pair of dust panels includes a first sloped side edge and a second sloped side edge between a second side edge and an upper edge, the second sloped side edge having a greater slope angle than the first sloped side edge relative to the upper edge.

* * * * *